Patented May 18, 1948

2,441,768

UNITED STATES PATENT OFFICE 2,441,768

METHOD OF REFINING TIN METAL

James Fernando Jordan, Huntington Park, Calif.

No Drawing. Application November 12, 1947,
Serial No. 785,538

4 Claims. (Cl. 75—85)

My invention relates to the art of refining tin metal.

While it is well known that oxygen has, at elevated temperatures, a greater affinity for iron than it has for tin, metallurgists have always experienced difficulty in taking advantage of the fact for refining purposes. When oxygen is introduced into a molten iron-bearing tin metal at a temperature that lies below the melting point of iron oxide, a dross is formed as the iron in the tin metal is oxidized. This dross contains so high a percentage of entrained tin that said dross cannot be economically discarded, but must needs be recycled into the smelting process in order to recover the entrained tin—in short, the separation is not clean enough to be effective. When, on the other hand, oxygen is introduced into a molten iron-bearing tin metal at a temperature that lies above the melting point of iron oxide, the iron oxide formed as the iron content of the tin is oxidized melts to form a slag that separates cleanly from the molten metal. However, at such temperatures as are compatible with the presence of molten iron oxide, tin metal volatilizes rapidly when exposed to an oxidizing atmosphere—such as is created when oxygen is introduced into the tin metal.

I have discovered how to preferentially oxidize the iron contained in a molten iron-bearing tin metal, so as to obtain a clean separation of said iron from said tin. My method consists of treating the molten iron-bearing tin metal with the reagent, ferric oxide. The reaction:

$$Fe + Fe_2O_3 \rightarrow 3FeO \quad (1)$$

The conventional practice for smelting tin ore consists of minimizing the reducing action so that the reduced tin metal will contain no more than a few percent of iron. With the percentage of iron in the tin metal low, said metal may be drossed at a low temperature with oxygen without producing an unduly large amount of said dross. But in so restricting the reducing action, so as to minimize the reduction of iron, the tin metallurgist is forced to permit the slag from the smelting action to carry a large amount of tin. In order to prevent the loss of this tin, the slag must be smelted in an operation that, different from the ore smelting operation, aims at reducing the maximum amount of tin possible under the reducing conditions prevalent within the smelting furnace. The high-iron tin metal produced by smelting the high-tin slag is normally employed as a reducing agent in the ore smelting operation.

This multi-step smelting procedure is naturally quite expensive, and it would be of definite value to the tin industry if a procedure could be developed that would permit the tin metallurgist to smelt his ores by means of a single-step practice. My discovery of the potentialities of Reaction 1, relative to an iron-bearing tin metal, constitutes a step towards the realization of such a single-step practice.

I employ ferric oxide to oxidize the iron contained in an iron-bearing tin metal by proceeding in one of the following three ways:

(1) I collect the iron-bearing tin metal—hereinafter referred to as "hardhead"—on the hearth of a reverberatory furnace, and, if the hardhead is not already molten, I melt said hardhead. If the hardhead is already molten, as would be the case at the completion of a smelting operation, I tap-off most of the slag, leaving only enough on the molten metal to protect it from the furnace atmosphere. With the molten hardhead covered by a thin slag layer, and with the molten bath at a high enough temperature to cause the slag to be molten—presumably above 2400° F.—I build up the ferric oxide content of the slag by charging hematite ore into the furnace. The circumstances surrounding the hematite addition must be governed by the following considerations: (a) due to the easy reducibility of $Fe_2O_3$, the firing arrangements of the furnace must be adjusted to yield as highly an oxidizing atmosphere as possible, else the $Fe_2O_3$ will be reduced partially to FeO; (b) the hematite should not be charged faster than the slag can absorb said ore—in this connection, it should be remembered that $Fe_2O_3$ is not very soluble in an acid slag, but is very soluble in basic slags; (c) the iron oxide content of the slag should not be built up to the point where excessive attack upon the furnace sidewall occurs—with an acid slag, the ore should not be added in such amounts as will throw the slag over to the basic side; with a basic slag, the iron oxide content of the slag should not be allowed to exceed 50%; (d) it is important to remember that it is the $Fe_2O_3$ content of the slag—not the total iron oxide or the FeO content—that causes the slag to exhibit a capacity to enter into Reaction (1); and (e) the higher the $Fe_2O_3$ content of the slag, the stronger the oxidizing action.

With a hardhead carrying some 20 or 30% iron, it is permissible to carry the $Fe_2O_3$ content of the slag much higher than when the tin metal carries only a few percent of iron; that is, a high percentage of $Fe_2O_3$ may not cause the oxidation of any appreciable amount of tin metal so long as the iron content of the tin metal is high, but as the iron content of the hardhead falls the $Fe_2O_3$ content of the slag had best recede also—else tin may be oxidized and lost to the slag. For example, in certain tests which I made, I carried the ferric oxide content of an acid slag at about 25% when the iron content of the hardhead was above 10%, and I carried the $Fe_2O_3$ content of the slag at below 10% when the iron content of the hardhead fell below 5%. Furthermore, I generally considered the refining action to be over when the iron content of the hardhead fell below 3%, due to the high tin losses to the slag that occurred when the iron content of the hardhead was low.

When the iron content of the hardhead has fallen to a level that may be conveniently handled by conventional drossing methods, the refining action had best be stopped by separating the slag and metal—presumably by tapping the furnace.

(2) Reaction 1 may be carried out by causing the iron oxide content of the slag to transport the oxidizing influences of the furnace atmosphere to the slag-metal interface. This method is quite slow, but is acceptable if time is no object. This method is predicated upon the fact that the iron compounds in a slag will be oxidized to the higher state when said compounds diffuse to the gas-slag interface of a gas-fired furnace—the oxidizing agents being oxygen, carbon dioxide, and water vapor. The ferric compounds formed at the gas-slag interface diffuse to the slag-metal interface where they interact in accordance with Reaction 1. The strength of the oxidizing action is predicated upon the iron oxide content of the slag. The speed of the reaction, in any given situation, is predicated upon the iron oxide content of the slag, the fluidity of the slag, and the thickness of the slag layer.

In this method, I merely allow the molten iron-bearing tin metal to stand in contact with a thin layer of iron bearing slag within a furnace that is gas-fired. The slag may be either acid or basic. The furnace firing is adjusted to give an oxidizing flame.

It is to be noted that this diffusion method of transporting oxygen to the slag-metal interface more or less automatically enters into the previously described method wherein the charged $Fe_2O_3$ is presumably the main oxygen source. This follows because as the charged $Fe_2O_3$ is reduced to FeO, said FeO diffuses to the gas-slag interface to become oxidized back to the ferric state. As this diffusion of oxygen becomes active, however, the rate of diffusion is so slow that ore charges would bear the burden of the oxidation.

The $Fe_2O_3$ content of an acid slag does not possess the activity towards Reaction 1 that the same percentage of $Fe_2O_3$ exhibits in a basic slag. This is undoubtedly due to: (1) the low solubility of ferric oxide in acid slags, and (2) to the fact that most basic slags contain bases which have a greater affinity for silica than has ferric oxide. In any case, the maximum reactivity that I have noted for Reaction 1, whether the oxygen was being diffused or charged as ore, was in a slag where $$\frac{CaO}{SiO_2} = \text{was greater than } 1.0$$

I found that such a slag will oxidize the iron contained in a hardhead even if only a few percent of iron is present in the slag.

(3) Reaction 1 may be instigated by charging dense lumps of hematite ore into the bath of metal and slag. These heavy, dense lumps of ore will sink through the molten slag cover to float on, and in direct contact with, the molten hardhead. This method of providing the oxygen required in Reaction 1 is far and away the most efficient and rapid. Furthermore, the oxidizing action of this method of charging oxygen seems to be much more powerful than the action obtained in Methods (1) and (2)—probably due to the fact that the iron content of the hardhead is placed into contact with a reagent containing nearly 100% of ferric oxide. The oxidizing action of hematite is so strong that I found that considerable tin is oxidized when the iron content of the hardhead falls much below 5%—a condition that may be partially corrected by introducing the ferric oxide in the form of hard, dense lumps of $FeO.Fe_2O_3$—magnetite ore.

In this method, I charge the dense lumps of ore into the middle of the bath within the furnace—particularly if the furnace is acid-lined; for, by confining the charged ore to the middle of the bath, I can maintain a rapid reaction rate without endangering the furnace sidewalls with a slag that contains an excessive amount of iron oxide.

When treating hardhead that contains a high percentage of iron, I have found certain advantages in combining Methods (2) and (3). Thus, by first oxidizing the major part of the iron content of the hardhead by charging dense lumps of ore directly into the bath until said iron in the hardhead has fallen below 10%, and then stopping the ore additions so as to permit the oxidation to proceed by diffusion until the tin metal contains less than 5% iron, I have succeeded in eliminating large amounts of iron from tin metal without oxidizing any appreciable amount of the tin.

When refining high-iron tin metal in an acid-lined furnace the iron oxide content of the slag rises to a point that occasionally threatens the refractory lining. In such cases, a portion of the high iron oxide slag should be tapped off, and the remaining slag diluted by means of charges of lime and silica. These lime-silica charges should be, of course, in keeping with the acidic nature of the furnace lining. Instead of diluting the slag with a lime-silica charge, said slag may be diluted with any acidic, low-iron waste slag. Thus, the waste slag that is obtained when tin ore is smelted may be utilized for diluting down the iron oxide content of the slag employed in the process being herein disclosed, but only if said waste slag is low in iron oxide.

The expression "iron ore," as employed in the claims, shall be taken to mean any iron ore containing ferric oxide; or any iron ore that, upon ignition, yields a product that contains ferric oxide; or any material that contains ferric oxide, even though such material may not be a natural ore; or any ore of the magnetite type—which type is presumed to contain ferric oxide, in accordance with the formula: $FeO.Fe_2O_3$.

The expressions "ferric oxide" and "ferrous oxide," employed in the claims in connection with the composition of the slag, refer to the active compounds of interest in this invention, even though said ferric and ferrous oxides may actually exist in said slag in more complex combinations, such as: $Fe_2O_3.CaO$, or $FeO.SiO_2$.

Having now described several forms of my invention, I wish it to be understood that my inven- tion is not to be limited to the specific form or arrangement of steps herein disclosed.

I claim as my invention:

1. The process of removing iron from a molten tin metal containing iron, which comprises: collecting said molten tin metal as a pool on the hearth of a furnace; adjusting the atmosphere of said furnace so that said atmosphere is oxidizing towards compounds of iron; protecting said pool of metal from direct contact with said oxidizing furnace atmosphere by covering said pool of metal with a layer of slag containing ferric oxide; allowing said pool of metal and said slag layer containing ferric oxide to remain in contact wth each other, so as to permit said ferric oxide to oxidize the iron content of said pool of metal; and separating said pool of metal from said slag layer after the iron content of said pool of metal has been lowered by reaction with said ferric oxide.

2. The process of removing iron from a molten tin metal containing iron, which comprises: collecting said molten tin metal as a pool on the hearth of a furnace; adjusting the atmosphere of said furnace so that said atmosphere is oxidizing towards compounds of iron; protecting said pool of metal from direct contact with said oxidizing furnace atmosphere by covering said pool of metal with a layer of slag; charging iron ore into said furnace so that said ore becomes dispersed throughout and dissolved within said layer of slag; allowing said pool of metal and said slag layer containing iron ore to remain in contact with each other, so as to permit the ferric oxide content of said slag layer to oxidize the iron content of said pool of metal; and separating said pool of metal from said slag layer after the iron content of said pool of metal has been lowered by reaction with said ferric oxide.

3. The process of removing iron from a molten tin metal containing iron, which comprises: collecting said molten tin metal as a pool on the hearth of a furnace; adjusting the atmosphere of said furnace so that said atmosphere is oxidizing towards compounds of iron; protecting said pool of metal from direct contact with said oxidizing furnace atmosphere by covering said pool of metal with a layer of slag; charging into said furnace lumps of iron ore which are dense enough to sink to the bottom of said slag layer to contact said pool of metal; allowing said pool of metal and said ore lumps to remains in contact with each other, so as to permit the ferric oxide content of said ore lumps to oxidize the iron content of said pool of metal; and separating said pool of metal from said slag layer after the iron content of said pool of metal has been lowered by reaction with said ferric oxide.

4. The process of removing iron from a molten tin metal containing iron, which comprises: collecting said molten tin metal as a pool on the hearth of a furnace; protecting said pool of metal from direct contact with the atmosphere of said furnace by covering said pool with a layer of molten slag whose ferric oxide content is not sufficient to oxidize the amount of iron that is to be removed from said pool of metal; allowing said pool of metal and said slag layer containing ferric oxide to remain in contact with each other, so as to permit said ferric oxide to oxidize the iron content of said pool of metal; adjusting the atmosphere of said furnace so that said atmosphere is oxidizing towards compounds of iron, so that the ferric oxide content of said slag that is reduced to ferrous oxide by the iron content of said pool of metal will be reoxidized back to the ferric state by said atmosphere; and separating said pool of metal from said slag layer after the iron content of said pool of metal has been lowered by reaction with said ferric oxide.

JAMES FERNANDO JORDAN.

REFERENCES CITED

The following references are of record in the file of this patent:

UNITED STATES PATENTS

| Number | Name | Date |
| --- | --- | --- |
| 1,436,961 | Johnson | Nov. 28, 1922 |
| 1,514,443 | Davis | Nov. 4, 1924 |